United States Patent [19]

Springer et al.

[11] Patent Number: 4,756,800

[45] Date of Patent: Jul. 12, 1988

[54] METHOD FOR PRODUCING SALTS OF MONOPEROXYSULFURIC ACID AND SIMULTANEOUSLY BLEACHING PULP

[75] Inventors: Edward L. Springer, Madison; James D. McSweeny, Waunakee, both of Wis.

[73] Assignee: The United States of America as represented by the Secretary of Agriculture, Washington, D.C.

[21] Appl. No.: 903,174

[22] Filed: Sep. 3, 1986

[51] Int. Cl.$^4$ ............... D21C 3/00; C02F 1/68; C01B 15/06

[52] U.S. Cl. ............... 162/64; 162/65; 162/78; 162/79; 210/763; 210/928; 423/513

[58] Field of Search ............... 423/513, 551; 162/6, 162/7, 36, 65, 64, 78, 79; 210/763, 528

[56] References Cited

U.S. PATENT DOCUMENTS

| | | | |
|---|---|---|---|
| 2,802,722 | 8/1957 | Stephanou | 23/114 |
| 2,886,412 | 5/1959 | Lake et al. | 23/114 |
| 2,886,534 | 5/1959 | Lake et al. | 252/186 |
| 2,899,272 | 11/1957 | Flach | 23/114 |
| 2,901,318 | 8/1959 | D'Addieco | 23/114 |
| 2,901,319 | 8/1959 | D'Addieco | 23/114 |
| 2,955,020 | 10/1960 | Darbee et al. | 23/114 |
| 3,036,885 | 5/1962 | Muller et al. | 23/114 |
| 3,186,942 | 6/1965 | Beuser | 210/763 |
| 3,549,314 | 12/1970 | Shah | 423/551 |
| 3,736,224 | 5/1973 | Grayson et al. | 165/65 |
| 3,867,246 | 2/1975 | Hebbel et al. | 162/78 |
| 3,900,555 | 7/1975 | Jourdan-Laforte | 423/365 |
| 3,920,794 | 11/1975 | La Mantia et al. | 423/551 |
| 4,049,786 | 9/1977 | Chaing | 423/513 |
| 4,061,743 | 12/1977 | Senjo et al. | 423/242 A |
| 4,152,409 | 5/1979 | Nase et al. | 423/551 |
| 4,182,648 | 1/1980 | Pradt et al. | 162/65 |
| 4,404,061 | 9/1983 | Cael | 162/78 |
| 4,475,984 | 10/1984 | Cael | 162/78 |
| 4,532,007 | 7/1985 | Moren | 210/928 |
| 4,537,686 | 8/1985 | Borbely et al. | 210/763 |
| 4,549,929 | 10/1985 | Tay et al. | 162/83 |
| 4,615,873 | 10/1986 | Devuyst | 423/367 |

OTHER PUBLICATIONS

Springer et al, Bleaching Groundwood and Kraft Pulps with Potassium Peroxymonosulfate Comparison with Hydrogen Peroxide, TAPPI Proceedings 1986, Pulping Conference, Oct. 26–30, 1986, TAPPI Press, 1986, pp. 671–681, Book 3.

"An Oxidant of Unexpected Utility", Devuyst, et al, Chemtech., 9(7): pp. 426–427, (1979).

*Primary Examiner*—Gary P. Straub
*Attorney, Agent, or Firm*—M. Howard Silverstein; John D. Fado

[57] ABSTRACT

A method of producing salts of monoperoxysulfuric acid comprising reacting together, in the presence of a catalyst consisting of cupric ions in a concentration of at least 0.01 part per milion, (a) a solution of aerated water having a pH of from about 8 to about 14, and (b) a sulfur-containing reactant, wherein said reactant comprises sulfur dioxide or a sulfite. If a pulp is added to the reaction mixture and the cupric ion concentration is increased, the monoperoxysulfuric acid salts that are genrated in situ in the reaction mixture will simultaneously bleach the pulp.

12 Claims, No Drawings

METHOD FOR PRODUCING SALTS OF MONOPEROXYSULFURIC ACID AND SIMULTANEOUSLY BLEACHING PULP

BACKGROUND OF THE INVENTION

1. Field of the Invention

This invention relates to a method for using cupric ions as a catalyst to produce salts of monoperoxysulfuric acid. This invention also relates to a method for using cupric ions as a catalyst to simultaneously generate monoperoxysulfuric acid salts and bleach pulp.

2. Description of Related Art

Strong oxidizing agents such as monoperoxysulfuric acid salts are used in producing organic chemicals, treating industrial wastes, bleaching textiles and wood pulps, and as ingredients in cleaning powders and cleansing solutions. A number of U.S. patents disclose processes for making salts of monoperoxysulfuric acid, as exemplified by the following.

U.S. Pat. No. 2,955,020 to Darbee et al. discloses forming monopersulfates using a catalytic amount of a strong inorganic acid. U.S. Pat. No. 4,049,786 to Chiang discloses preparation of a high strength peroxymonosulfate by adding concentrated sulfuric acid to a solution of a soluble peroxydisulfate whereby the heat of solvation of the sulfuric acid hydrolyzes the peroxydisulfate to the peroxymonosulfate. U.S. Pat. No. 3,900,555 to Jourdan-Laforte discloses a process for obtaining monopersulfuric acid from hydrogen peroxide and sulfuric acid. U.S. Pat. No. 3,036,885 to Muller et al. discloses a process for the production of peroxysulfuric acid salts by reacting hydrogen peroxide and a persulfate in the presence of sulfuric acid and water. U.S. Pat. Nos. 2,901,318 and 2,901,319 to D'Addieco disclose processes for producing potassium monopersulfate by reacting a monopersulfuric acid solution containing sulfuric acid with a potassium compound of the group consisting of carbonate, bicarbonate and hydroxide. Crystallization of the potassium monopersulfate from aqueous solutions yields a stable monohydrate. U.S. Pat. No. 2,899,272 to Flach et al. discloses producing a metal persulfate by reacting an aqueous solution of ammonium persulfate and a metal hydroxide. U.S. Pat. Nos. 2,886,412 and 2,886,534 to Lake et al. disclose producing a dry, free-flowing monopersulfate product by adding a boron compound to an aqueous solution of an alkali metal monopersulfate, and thereafter drying the resulting solution. U.S. Pat. No. 2,802,722 to Stephanou discloses producing a solid monopersulfate by reacting monopersulfuric acid, a hydroxide, and a carbonate.

Unfortunately, such processes heretofore have had drawbacks such as low efficiency, high complexity, or high expense.

Recently, however, researchers found that a strong oxidizing agent can be produced by adding calcium or sodium sulfite to vigorously aerated water. Devuyst et al., *An Oxidant of Unexpected Utility*, Chemtech., 9(7): pp. 426–427(1979). Such work is of interest because it is desirable to cheaply produce a nonchlorine-containing strong bleaching agent for wood pulps. Chlorine and chlorine compounds, although currently much used in bleaching, lead to bleach spent liquor disposal difficulties because the resultant chlorinated organic materials are mutagenic and very darkly colored.

Surprisingly, it has been discovered that the reaction between calcium or sodium sulfite and aerated water to produce monoperoxysulfate can be catalyzed by cupric ions. It has further been discovered that cupric ions can be used to catalyze the generation of monoperoxysulfuric acid salts in situ in a reaction mixture containing pulp, thereby simultaneously bleaching the pulp.

SUMMARY OF THE INVENTION

A method has now been discovered for producing salts of monoperoxysulfuric acid comprising reacting together, in the presence of a catalyst consisting of cupric ions in a concentration of at least 0.01 parts per million, (a) a solution of aerated water having a pH of from about 8 to about 14, and (b) a sulfur-containing reactant, wherein said reactant comprises sulfur dioxide or a sulfite.

According to a preferred embodiment of the present invention, cupric ions are used to catalyze the generation of monoperoxysulfuric acid salts in situ in a reaction mixture containing pulp, thereby simultaneously bleaching the pulp.

DETAILED DESCRIPTION OF THE INVENTION

1. Generation Procedure

A sulfur-containing reactant comprising sulfur dioxide or a sulfite, such as sodium sulfite or calcium sulfite, is fed at a carefully measured rate into a reaction vessel containing a solution of aerated water having a pH of from about 8 to about 14, and a catalytic amount of cupric ion. The sulfite must be added to the reaction vessel at a rate that balances the oxygen input into the solution according to the equation:

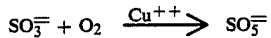

If excess sulfite is added, the following reaction takes place thereby reducing the monoperoxysulfate anion ($SO_5^=$) concentration:

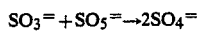

The temperature of the reaction mixture can range from about 0° C. to about 80° C., and preferably from about 2° C. to about 55° C., with the lower temperatures providing higher quantities of conversion. Higher temperatures allow less oxygen dissolution and therefore less oxidant production, but can be advantageous for applications discussed hereinafter, which involve simultaneously generating oxidant and bleaching pulp.

The pH of the reaction mixture can be maintained at from about 8 to about 14 by the addition of alkali such as sodium hydroxide. Good results are obtained when the pH is maintained at from about 12 to about 12.9.

The cupric ion concentration in the reaction mixture can be from about 0.01 to about 100 parts per million, preferably from about 0.04 to about 0.8 parts per million, with from about 0.12 to about 0.32 parts per million providing good results. Conveniently, the cupric ion can be supplied as cupric sulfate ($CuSO_4$).

Tables 1 and 2 illustrate the results from seven experimental runs, wherein monoperoxysulfate oxidant was generated using the above-described method. Sodium sulfite was used as the sulfur-containing reactant. The results of these experiments provide guidance for setting the parameters of the reaction to achieve maximum oxidant production.

In Runs 1-7 (Table 1), air was continuously bubbled at a fixed rate of 3.0 liters per minute through a coarse fritted glass sparger into a pyrex glass beaker containing one liter of distilled water, a fixed quantity of copper sulfate, and sodium hydroxide sufficient to maintain the appropriate pH. Simultaneously, a solution of sodium sulfite was continuously added dropwise by gravity, while vigorously agitating the reaction mixture with a motor-driven glass impeller. Mixing was needed to evenly distribute the added sulfite and to facilitate rapid mass transfer of oxygen from the airstream. To ensure that the rate of sulfite addition did not exceed the rate of oxygen dissolution, with consequent quenching of the reaction, a platinum electrode monitored the redox potential. A small aliquot of the reaction mixture was removed at various intervals to analyze formation of the oxidant by the potassium iodide-sodium thiosulfate method.

The pH was monitored with a combination electrode, and the pH lowering effect of carbon dioxide in the airstream was offset by small additions of sodium hydroxide. The additions were minimized by insertion of a carbon dioxide trap containing 0.5 molar sodium hydroxide into the airstream.

In Runs 1-7, water and alkali were added, and air was admitted and mixed while heating or cooling to the desired temperature, using a hot plate or ice water bath. The air was bubbled for a period of 15 minutes or more to saturate the solution before adding sulfite. Just before starting sulfite addition, the copper catalyst was added and the pH readjusted.

Runs 2 and 3. Beyond 0.8 parts per million cupric sulfate, i.e., about 0.32 parts per million cupric ion, there appears to be no benefit obtained. The slightly lower generation at 2.0 parts per million of cupric sulfate (0.8 ppm cupric ion) may indicate the beginning of the effect of increasing instability of the oxidant once formed, when excessive levels of copper are present.

Runs 4 and 5 illustrate that when the catalyst concentration is near optimum, a small increase in pH has a marked effect, with a pH of 12.9 producing the most oxidant. Table 2 illustrates that the time required for maximum conversion efficiency (75 minutes) is much less than the time required to generate maximum concentration of oxidant (180 minutes).

Runs 6 and 7 illustrate that a higher reactor temperature lowers the available oxygen in solution and increases the instability of the generated oxidant, resulting in a lower oxidant yield. While the other conditions, except sulfite concentration, are the same as in Run 4, the higher temperature in Run 7 results in a much lower generation of oxidant and conversion of added sulfite. The lower concentration of added sulfite is needed to avoid quenching the reaction.

Thus, generation of peroxymonosulfate can be effected by adding a sodium sulfite solution to aerated, purified water containing cupric ions (copper sulfate) and alkali (sodium hydroxide). Optimum conditions for oxidant generation appear to be as follows: cupric ion, from about 0.12 to about 0.32 parts per million; pH, from about 12.5 to about 12.9; and temperature, from about 2° C. to about 5° C. The concentration and rate of TABLE 1
Generation of Oxidant Using Sodium Sulfite

| | Run Number | | | | | | |
|---|---|---|---|---|---|---|---|
| | 1 | 2 | 3 | 4 | 5 | 6 | 7 |
| Temperature (°C.) | 2 | 2 | 2 | 2 | 2 | 55 | 55 |
| pH | 12.0 | 12.0 | 12.0 | 12.5 | 12.9 | 12.5 | 12.5 |
| $CuSO_4$ (ppm) | 0.1 | 0.8 | 2.0 | 0.4 | 0.4 | 0.4 | 0.4 |
| $Na_2SO_3$ (M) | 1.19 | 1.19 | 1.19 | 1.19 | 1.19 | 0.397 | 0.794 |
| Addition Rate of $Na_2SO_3$ (mL/min.) | 0.160 | 0.142 | 0.172 | 0.150 | 0.137 | 0.175 | 0.150 |
| Air Rate (L/min.) | 3 | 3 | 3 | 3 | 3 | 3 | 3 |
| Total Time (min.) | 105 | 120 | 130 | 120 | 180 | 90 | 120 |
| Total $Na_2SO_3$ Added (mmoles) | 19.4 | 20.3 | 26.6 | 21.4 | 29.3 | 6.25 | 14.3 |
| Total Oxidant Generated (mmoles) | 1.60 | 2.10 | 2.00 | 3.50 | 4.60 | 0.36 | 1.00 |
| Percent Conversion | 8.2 | 10.3 | 7.5 | 16.4 | 15.7 | 5.8 | 7.0 |

TABLE 2
Time Schedule for Run 5 of Table 1

| | Reaction Time | | | |
|---|---|---|---|---|
| | 0 | 75 | 120 | 180 |
| Temperature (°C.) | 2 | 2 | 2 | 2 |
| pH | 12.9 | 12.9 | 12.9 | 12.9 |
| $CuSO_4$ (ppm) | 0.4 | 0.4 | 0.4 | 0.4 |
| $Na_2SO_3$ (M) | 1.19 | 1.19 | 1.19 | 1.19 |
| Addition Rate of $Na_2SO_3$ (mL/min.) | 0.137 | 0.137 | 0.137 | 0.137 |
| Air Rate (L/min.) | 3 | 3 | 3 | 3 |
| Total $Na_2SO_3$ Added (mmoles) | 0 | 12.2 | 19.6 | 29.3 |
| Total Oxidant Generated (mmoles) | 0 | 3.24 | 4.24 | 4.60 |
| Percent Conversion | 0 | 26.6 | 21.6 | 15.7 |

Run 1 illustrates apparently acceptable minimum ranges for pH and catalyst concentration, in terms of both oxidant generation and conversion efficiency. With the other parameters of Run 1 retained, the effect of increasing catalyst concentration is demonstrated in sodium sulfite addition are dependent upon the rate of reaction and thus the other parameters selected. Generally the concentration ranges from about 0.8 to 1.2 molar, and the rate of addition is from about 0.14 to about 0.18 mL per minute. Excessive addition will result in a sharp drop in redox potential of the reactor solution and consequent loss of oxidant. The stability of generated oxidant can be greatly enhanced for temporary storage by lowering its pH to 5 or less.

2. Simultaneous Generation and Bleaching Using Sodium Sulfite

This process involves using cupric ions as a catalyst to generate peroxymonosulfate salts in situ in a reaction mixture containing delignified kraft pulp, thereby simultaneously bleaching the pulp. The equipment and procedure involved are essentially the same as described above, except that pulp is added to the alkaline solution immediately before sulfite addition is started. In order to maintain the necessary amount of copper catalyst in solution, the pulp can be pretreated with cupric ions in order to satisfy the exchange capacity of the pulp for free copper. An acceptable pretreatment process involves soaking the pulp with an excess of cupric ion (e.g. in a cupric sulfate solution), followed by washing with distilled water. As in generation, cupric ions are added to the reactor mixture. However, for bleaching, a larger quantity of cupric ion catalyst, at least about 0.5 part per million and preferably from about 2.4 to about 9.6 parts per million, is required in order to satisfy some additional exchange sites which are created during oxidation of the pulp. These values are based upon the estimated overall concentration of cupric sulfate in the solution part of the reaction mixture assuming complete solubility of the cupric ions. After the treatment period, which is usually a few hours, the pulp is washed with distilled water, subjected to a two-step post treatment with sodium bisulfite, and then given a final water wash. The posttreatment process is necessary in order to remove bound copper, which would otherwise impart a darker color to the pulp. The acidity of the bisulfite regenerates the exchange sites from copper to the hydrogen form. Any acid which imparts a solution having a pH of approximately 3 will work effectively in this regard.

The pH of the reaction mixture can be maintained at from about 11.3 to about 12.2, with from about 12.0 to about 12.2 providing good results. The cupric ion concentration can be from about 2.4 to about 9.6 parts per million, although from the results of Runs 8–14, which are shown in Table 3, there are no clear effects from differing catalyst levels. The temperature of the reaction mixture can range from about 22° C. to about 65° C., with about 50° C. providing good results.

As in the basic generation process, the quantity and rate of sulfite addition for Runs 8–14 depended on the reaction rate, as indicated by redox potential. However, the concentration levels were significantly lower than for generation alone, even when corrected for the lower volume proportions. In general, the concentrations required were from about 0.08 to about 0.2 molar depending on reactor volume, and delivery rates were from about 0.2 to about 0.4 mL/minute.

In Runs 8–14, the pulp used was an aspen kraft pulp originally 54% yield, No. 16 kappa, which was delignified by chlorination and alkaline extraction to kappa No. 6. The pretreatment consisted of soaking the pump for approximately 16 hours at 1.0% consistency in a 0.10% cupric sulfate solution. For treatment, the water was heated and air bubbled for at least 15 minutes. A measured quantity of sodium hydroxide was added, followed by addition the pulp and then catalyst prior to sulfite addition. No further pH adjustment was made and the pH invariably dropped 0.2 unit by the end of the run.

TABLE 3

Simultaneous Generation and Bleaching Using Sodium Sulfite

| | Run Number | | | | | | |
|---|---|---|---|---|---|---|---|
| | 8 | 9 | 10 | 11 | 12 | 13 | 14 |
| Temperature (°C.) | 50 | 50 | 50 | 50 | 22 | 65 | 50 |
| Starting pH | 12.2 | 12.2 | 12.2 | 12.2 | 12.2 | 12.2 | 11.3 |
| Added CuSO$_4$ (ppm) | 24 | 10 | 20 | 17 | 10 | 10 | 10 |
| Air Rate (L/min.) | 2 | 2 | 2 | 2 | 2 | 2 | 2 |
| Weight of Pulp (g) | 3 | 3 | 3 | 3 | 3 | 3 | 3 |
| Initial Weight of Pulp and Water (g) | 250 | 250 | 250 | 500 | 250 | 250 | 250 |
| Na$_2$SO$_3$ (M) | 0.119 | 0.119 | 0.0794 | 0.198 | 0.119 | 0.0794 | 0.0794 |
| Addition Rate of Na$_2$SO$_3$ (mL/min.) | 0.267 | 0.267 | 0.375 | 0.167 | 0.323 | 0.400 | 0.217 |
| Total Time (min.) | 60 | 60 | 120 | 120 | 60 | 60 | 120 |
| Total Na$_2$SO$_3$ Added (mmoles) | 1.90 | 1.90 | 3.57 | 5.94 | 2.30 | 1.90 | 2.06 |
| Brightness (%) | 63.5 | 63.8 | 67.1 | 69.6 | 58.2 | 61.9 | 62.3 |
| Initial Brightness (%) | 53.4 | 53.4 | 53.4 | 53.4 | 53.4 | 53.4 | 53.4 |

Runs 8–11 illustrate apparently optimum conditions of temperature and pH. In Runs 8 and 9, the reaction time and the amount of sulfite added are the same, with the only difference being the quantity of catalyst added. The similarity of the end results (brightness) indicates that the higher catalyst concentration is unnecessary. The initial pulp brightness is 53.4 when subjected to post-treatment only.

Run 10 shows that further bleaching can be effected by using conditions similar to Runs 8 and 9, and extending the reaction time and thus the amount of added sulfite. Longer runs will show a point of diminishing return, however, since the accumulation of added salts will eventually have a negative effect on the reaction.

Run 11 illustrates that the bleaching effect can be further increased by enlarging the reactor volume and proportionately increasing the sulfite concentration. Runs 12 and 13 demonstrate the effect of temperature on simultaneous oxidant generation and bleaching. The bleaching results of both runs are inferior when compared with Run 9 (50° C.), which produced higher brightness while using less sulfite.

Run 14, when compared to Run 8, illustrates the detrimental effect on resulting brightness from running the reaction at a slightly lower pH. While the end result of Run 14 is only slightly less favorable than in Run 8, the required reaction time is doubled and a little more sulfite is needed.

3. Simultaneous Generation and Bleaching Procedure Using Calcium Sulfite

Simultaneous generation of oxidant and bleaching of pulp using calcium sulfite involves most of the same principles and procedures as that of the sodium salt. One of the differences is that calcium sulfite is largely insoluble in an alkaline solution. Therefore, it must be continuously mixed in slurry form to maintain a homogeneous mixture when adding it to the reaction mixture.

Another distinction of the calcium system is that careful control of reaction mixture pH is essential for good results. Advantageously, a second pump can be used to control addition of dilute solutions of alkali (e.g. calcium hydroxide) or acid (e.g. sulfuric acid), depending upon the reaction mixture pH. The initial pH of the reactor solution is preferably adjusted with calcium hydroxide, but otherwise, the procedure for pulp pretreatment and reaction startup is the same as in the sodium sulfite system.

The results of Runs 15–21, wherein calcium sulfite was used to simultaneously generate oxidant bleach pulp, are shown in Tables 4–11. In these experimental runs, the slurry was magnetically stirred in the beaker to maintain a homogeneous mixture. Because of the stirring requirement, gravity feed addition was not feasible and a variable speed peristaltic pump and 1/16 inch I.D. Tygon tubing was used.

Before each run, calcium sulfite was freshly prepared by bubbling sulfur dioxide through a stirred mixture of calcium hydroxide. When the mixture pH dropped to approximately 5, indicating a stoichiometric excess of sulfur dioxide, the gas was removed and the pH was then raised to about 11.5 with sodium hydroxide.

Because sulfur dioxide is acidic, it is preferable to use a sulfite as the sulfur-containing compound in the reaction of this invention, since the reaction mixture should be kept at an alkaline pH of at least about 8. Furthermore, the sulfite acts as a buffer and assists in stabilizing the pH of the reaction mixture, whereas the use of sulfur dioxide necessitates the addition of compensating amounts of alkali to the reaction mixture.

For Runs 15–21, four different species of delignified kraft pulp were used. The aspen pulp was identical to that used in the sodium sulfite Runs 8–14, and was pretreated and postreated in the same manner. The slash pine pulp, originally 45% yield and 38 kappa, was chlorinated and alkaline extracted to kappa No. 6. The birch pulp at 51% yield and kappa No. 13 was delignified, also to kappa no. No. 6. The spruce pulp, which was originally 50% yield and kappa no. 32, was delignified to kappa No. 7. These last three pulps were pretreated and postreated in a slightly different manner than the aspen. The pretreatment was at a lower pulp consistency, 0.2% instead of 1.0%; and posttreatment was a one step process with the pulp slurry adjusted to pH 2.5 with sulfuric acid for 4 minutes.

TABLE 5

CaSO$_3$ Addition/pH Schedule Run 15

| Time (min.) | pH | CaSO$_3$ (mL/min.) |
|---|---|---|
| 0 | 8.9 | 0.367 |
| 121 | 8.9 | 0.750 |
| 128 | 8.8 | 0.750 |
| 134 | 8.7 | 0.750 |
| 165 | 8.6 | 0.750 |
| 198 | 8.6 | 0 |
| 265 | 8.6 | — |

TABLE 6

CaSO$_3$ Addition/pH Schedule Run 16

| Time (min.) | pH | CaSO$_3$ (mL/min.) |
|---|---|---|
| 0 | 8.9 | 0.325 |
| 126 | 8.9 | 0.658 |
| 202 | 8.9 | 0 |
| 262 | 8.9 | — |

TABLE 7

CaSO$_3$ Addition/pH Schedule Run 17

| Time (min.) | pH | CaSO$_3$ (mL/min.) |
|---|---|---|
| 0 | 8.6 | 0.339 |
| 115 | 8.6 | 0.693 |
| 190 | 8.6 | 0 |
| 250 | 8.6 | — |

TABLE 8

CaSO$_3$ Addition/pH Schedule Run 18

| Time (min.) | pH | CaSO$_3$ (mL/min.) |
|---|---|---|
| 0 | 8.9 | 0.753 |
| 36 | 8.8 | 0.753 |
| 41 | 8.7 | 0.753 |
| 53 | 8.6 | 0.753 |
| 97 | 8.6 | 0 |
| 164 | 8.6 | — |

TABLE 4

Simultaneous Generation and Bleaching Using Calcium Sulfite

| | Run Number | | | | | | |
|---|---|---|---|---|---|---|---|
| | 15 | 16 | 17 | 18 | 19 | 20 | 21 |
| Pulp Species | Aspen | Aspen | Aspen | Aspen | Slash Pine | Birch | Spruce |
| Weight of Pulp (g) | 3 | 3 | 3 | 3 | 1 | 1 | 1 |
| Initial Weight of Pulp and Water (g) | 250 | 250 | 250 | 250 | 225 | 225 | 225 |
| CaSO$_3$ (M) | 0.02 | 0.02 | 0.02 | 0.02 | 0.02 | 0.02 | 0.02 |
| Total Time (min.) | 265 | 262 | 250 | 164 | 240 | 241 | 240 |
| Total CaSO$_3$ Added (mmoles) | 1.86 | 1.82 | 1.82 | 1.46 | 1.90 | 1.90 | 2.10 |
| Air Rate (L/min.) | 2.0 | 2.0 | 2.0 | 2.0 | 3.0 | 2.0 | 2.0 |
| Added CuSO$_4$ (ppm) | 6.3 | 6.4 | 6.4 | 6.4 | 10.7 | 8.9 | 8.9 |
| Temperature (°C.) | 50 | 50 | 50 | 50 | 50 | 50 | 50 |
| Brightness (%) | 70.6 | 63.1 | 59.9 | 67.0 | 49.2 | 64.9 | 48.8 |
| Initial Brightness (%) | 53.4 | 53.4 | 53.4 | 53.4 | 40.3 | 49.5 | 41.3 |

TABLE 9

CaSO₃ Addition/pH Schedule
Run 19

| Time (min.) | pH | CaSO$_3$ (mL/min.) |
|---|---|---|
| 0 | 8.9 | 0.417 |
| 120 | 8.9 | 0.750 |
| 133 | 8.8 | 0.750 |
| 139 | 8.7 | 0.750 |
| 165 | 8.6 | 0.750 |
| 180 | 8.6 | 0 |
| 240 | 8.6 | — |

TABLE 10

CaSO₃ Addition/pH Schedule
Run 20

| Time (min.) | pH | CaSO$_3$ (mL/min.) |
|---|---|---|
| 0 | 8.9 | 0.430 |
| 114 | 9.0 | 0.430 |
| 117 | 8.9 | 0.430 |
| 121 | 8.9 | 0.717 |
| 133 | 8.8 | 0.717 |
| 140 | 8.7 | 0.717 |
| 166 | 8.6 | 0.717 |
| 181 | 8.6 | 0 |
| 241 | 8.6 | — |

TABLE 11

CaSO₃ Addition/pH Schedule
Run 21

| Time (min.) | pH | CaSO$_3$ (mL/min.) |
|---|---|---|
| 0 | 9.0 | 0.467 |
| 119 | 8.9 | 0.467 |
| 120 | 8.9 | 0.800 |
| 130 | 8.8 | 0.800 |
| 137 | 8.7 | 0.800 |
| 164 | 8.6 | 0.800 |
| 180 | 8.6 | 0 |
| 240 | 8.6 | — |

Run 15 appears to exemplify the most favorable conditions for simultaneously generating oxidant and bleaching pulp, and the most responsive pulp of the four tested, the aspen. The conditions of temperature and pulp consistency for Run 15 are the same as in Runs 8-10 and 14 for the sodium system. However, the reaction appears to be more selective in that a lower sulfite concentration is used yielding a better result. When compared with Run 10 of the sodium system; 3.57 mmoles of sodium sulfite are needed to achieve 67.1% brightness, versus 1.86 mmoles of calcium sulfite needed to achieve 70.6% brightness, the efficiency advantage of calcium sulfite is clear.

One drawback may be the longer time requirement for calcium sulfite, but in Run No. 18, that disparity is not as great. The key parameter difference between the two systems appears to be pH control. With calcium, pH is lower, but more importantly it is varied downward from around 9.0 to 8.5, over a period of about 40 minutes. Another difference is the pumping rate of sulfite. As in Run 15, the most effective result appears to be obtained when a second (higher) level of sulfite addition is made shortly before and while pH is lowered. A final distinction is that there is a period of residual effectiveness when sulfite addition is discontinued. This is likely due to the fact that some of the previously added sulfite is still dissolving in the reactor.

Runs 16 and 17 demonstrate the lower effectiveness of a uniform pH either at 8.9 or 8.6, with the higher pH being somewhat better. These runs are otherwise comparable to Run 15, which utilizes bilevel sulfite addition and about the same total quantity.

Run 18 further clarifies the effect of pH on the reaction. In Run 18, the higher sulfite addition rate is used immediately, and after a shorter period of time than in Run 15, pH adjustment is initiated and completed. This adjustment is made at a point in time when the redox potential, and thus the reaction itself, has reached a plateau. Thus, the net effect of gradually lowering pH is that it allows the system to accept further additions of sulfite without a quenching effect on the reaction. In this case, the early use of a higher pump rate compressed the reaction sequence into a shorter period of time. The end result is a lower consumption of sulfite, but with an efficient level of bleaching attained.

Runs 19-21 utilize three different pulps and involve the same basic conditions and procedures as that of Run 15. However, these pulps are to a varying extent less responsive than the aspen, and therefore, pulp charge is reduced to increase the amount of oxidant on the pulp. One other difference is use of a higher air flow in Run 19. This is due to the bulky nature of the pine fiber, which has the effect of reducing the dissolved oxygen in the solution.

Thus, it is observed that both sodium and calcium sulfite salts can be used to simultaneously generate peroxymonosulfates and bleach pulps. This in situ method minimizes wasteful decomposition of the oxidant over the time period of generation. It appears to be most successful when employed on delignified kraft pulps of approximately 10 kappa No., or less. Hardwood species appear to be more responsive to the treatment than softwoods, and it is particularly effective with aspen.

As a phenomenon of sulfite oxidation, the generation reaction appears to possess some observable characteristics of a free radical chain mechanism. Notable among them is an inhibitory effect by small quantities of easily oxidizable organic materials, of which a good example would be a lower molecular weight alcohol such as methanol or ethanol. This characteristic makes it imperative that a clean system be maintained and that extraneous material not be introduced. It is this behavior which probably largely explains why the more "purified" low kappa pulps respond better, since there is less material in competition with the chromophores. The calcium system seems to be more sensitive to inhibitors and there is evidence that it forms a less stable oxidant, since it cannot be generated in analytical quantities. It does, however, seem to be the more potent of the two forms.

For both in situ systems, optimum conditions appear to comprise a reactor temperature of about 50° C., an airflow rate of 2-3 L/minute, a cupric ion concentration of from about 2.4 to about 9.6 parts per million, a pulp consistency of 0.4 to 1.2%, and sulfite added at such a concentration and rate so as to produce a slow increase in redox potential, without a quenching effect caused by excessive addition, until a redox plateau is reached or slightly passed. For the sodium system, a pH of 12.0 to 12.2 appears best. For the calcium system, the pH should start at from about 8.9 to about 9.0 and be slowly lowered to from about 8.5 to about 8.6 after the redox plateau is reached.

While various advantageous embodiments, and numerous experimental runs have been chosen to illustrate the invention it should be understood that they are not intended to limit the scope of this invention. It will be further understood by those skilled in the art that various changes and modifications can be made therein without departing from the scope of the invention as defined in the appended claims.

For example, other alkali metal, alkaline earth metal, or ammonium sulfites could be used to generate the monoperoxysulfates. The use of such other sulfites would simply require some basic experimentation to determine acceptable parameters, as in the sodium and calcium systems.

Furthermore, the foregoing values for cupric ion concentration are provided as guidelines for achieving acceptable results when using the process of this invention. It is understood that either lower or higher concentrations of cupric ion can possibly be employed to achieve acceptable results.

We claim:

1. A method of generating monoperoxysulfuric acid salts in situ while simultaneously bleaching pulp therewith, comprising:

providing a reaction mixture comprising water, pulp and a catalyst comprising cupric ions in a concentration of at least about 0.5 parts per million;

maintaining the pH of the reaction mixture from about 8 to about 14;

aerating the reaction mixture; and, then adding a source of sulfite ions to the reaction mixture while continuing the aeration during the adding of the source of sulfite ions, the source of sulfite ions being added at a rate such that the number of molecules of oxygen dissolved in the reaction mixture equals or exceeds the number of molecules of sulfite ions dissolved in the reaction mixture, whereby salts of monoperoxysulfuric acid are generated and act to bleach the pulp.

2. The method of claim 1, wherein the source of sulfite ions is sodium sulfite or calcium sulfite and the cupric ion concentration of the reaction mixture is at least about 2.4 parts per million, the temperature of the reaction mixture is from about 40° C. to about 60° C., the pH of the reaction mixture is maintained at from about 11.3 to about 12.2 when sodium sulfite is used and from about 8 to about 9 when calcium sulfite is used, and wherein the pulp is pretreated by soaking in a solution containing cupric ions.

3. The method of claim 1, wherein the source of sulfite ions is sulfur dioxide or a sulfite salt.

4. The method of claim 3, wherein the cupric ion concentration of the reaction mixture is from about 2.4 to about 9.6 parts per million.

5. The method of claim 3, wherein the source of sulfite ions is sodium sulfite.

6. The method of claim 5, wherein the cupric ion concentration of the reaction mixture is from about 2.4 to about 9.6 parts per million.

7. The method of claim 6, wherein the pH of the reaction mixture is maintained at from about 11.3 to about 12.2, and the temperature of the reaction mixture is maintained at from about 22° C. to about 65° C.

8. The method of claim 3, wherein the source of sulfite ions is calcium sulfite.

9. The method of claim 8, wherein the cupric ion concentration of the reaction mixture is from about 2.4 to about 9.6 parts per million.

10. The method of claim 9, wherein the pH of the reaction mixture is maintained at from about 8 to about 9, and the temperature of the reaction mixture is maintained at from about 22° C. to about 65° C.

11. The method of claim 1, wherein the pulp is pretreated by soaking in a solution containing cupric ions.

12. The method of claim 11, wherein the solution is a cupric sulfate solution, and wherein cupric sulfate is added to the reaction mixture.

* * * * *